United States Patent [19]
Hermant et al.

[11] Patent Number: 5,817,978
[45] Date of Patent: Oct. 6, 1998

[54] DEVICE AND METHOD FOR PRODUCING A SPLICE FOR CLADDED CABLES

[75] Inventors: Stéphane Hermant; Gilles Rouchaud, both of Montmirail, France

[73] Assignee: Axon 'Cable S.A., Montmirail, France

[21] Appl. No.: 701,671

[22] Filed: Aug. 22, 1996

[30] Foreign Application Priority Data

Aug. 23, 1995 [FR] France .................................. 95 10005

[51] Int. Cl.⁶ .................................................. H02G 15/08
[52] U.S. Cl. .................................. 174/75 C; 174/DIG. 8
[58] Field of Search ............................... 174/75 C, 88 C, 174/75 R, 93, DIG. 8

[56] References Cited

U.S. PATENT DOCUMENTS

| | | | |
|---|---|---|---|
| 2,536,003 | 12/1950 | Dupre | 174/88 C |
| 3,467,412 | 9/1969 | Gore et al. | 285/294.2 |
| 3,502,788 | 3/1970 | Albert | 174/88 R |
| 4,073,559 | 2/1978 | Lawson, Jr. | 174/88 R X |
| 4,144,404 | 3/1979 | De Groef et al. | 174/88 C |
| 4,879,807 | 11/1989 | Roucaute | 174/88 C X |
| 5,217,392 | 6/1993 | Hosler, Jr. | 439/585 |
| 5,221,815 | 6/1993 | Bostock et al. | 174/DIG. 8 X |
| 5,313,019 | 5/1994 | Brusselmans et al. | 174/93 |

FOREIGN PATENT DOCUMENTS 79 22973  4/1980  France .
WO 93/20600  10/1993  WIPO .

*Primary Examiner*—Bot L. Ledynh
*Assistant Examiner*—Marc D. Machtinger
*Attorney, Agent, or Firm*—Graham & James LLP

[57] ABSTRACT

A splicing device for connecting two electrical cables by forming a splice, each electrical cable including a sheath, a cladding and at least a first primary wire and a second primary wire. The cladding is surrounded by the sheath and surrounds the at least two primary wires. The splicing device includes a first electrical connector for connecting together the first primary wires of the two electric cables, and a second electrical connector for connecting together the second primary wires of the two electric cables. The splicing device further includes a first insulating sheath for covering the first electrical connector of the first primary wires, the first insulating sheath being made of a first material, and a second insulating sheath separated from the first insulating sheath for covering the second electrical connector of the second primary wires, the second insulating sheath being made of the first material. A holder is provided to maintain the first and second insulating sheaths in a constant relative position. The holder is made of a second material. The first and second materials and the thickness of the first and second sheaths and of the holder are chosen so that the characteristic impedance between the first and second electrical connectors of the splice is substantially equal to the characteristic impedance of each electrical cable. A continuity assembly is also provided for electrical continuity of the cladding.

10 Claims, 3 Drawing Sheets

DEVICE AND METHOD FOR PRODUCING A SPLICE FOR CLADDED CABLES

FIELD OF THE INVENTION

The present invention relates to a splicing device and to the method of producing a splice intended to connect two electric cables composed of a sheath, a cladding and at least two primary wires comprising a first primary wire and a second primary wire.

BACKGROUND OF THE INVENTION

When splicing two electric wires or cables, the problem is raised of the continuity of the electrical properties and characteristics between each of the two cables and the zone of join, i.e. the splice.

Numerous cases exist, for which two cables issuing from an assembly of components which are sometimes very complex, are to be joined end to end. For example, when a cable is deteriorated, it must be possible to repair it by assembling two unaffected portions of cable. When wiring large electric assemblies, it is necessary to assemble together electric subassemblies, more simple components, or to insert an electric element in an assembly which is already wired and assembled.

In all the cases set forth hereinabove, and in others too, it would be advantageous to be able to maintain all the electrical characteristics of the two butted cables constant.

Moreover, domains exist for which the deformation or loss of data is highly detrimental for the applications envisaged, such as the transmisison of analog data for example.

It is an object of the invention to provide a device and a method for making a splice which presents the electrical characteristics (characteristic impedance, capacitance) closest to the cables to be assembled.

SUMMARY OF THE INVENTION

According to the invention, this object may be attained by providing continuity means for the electrical continuity of the cladding, first means for the electrical connection of the first primary wires, second means for the electrical connection of the second primary wires, and insulating holding means which maintain the first and the second electrical connection means in a constant relative position and which are chosen so that the characteristic impedence of the splice is substantially equal or as close aspossible to that of the cable.

When the splicing device according to the invention is used, a cladding is conserved at the level of the splice, which makes it possible to protect the splice from certain outside aggressions such as mechanical shocks or various electromagnetic phenomena.

Insulating holding means are used of which the geometry and material have been chosen so that these insulating holding means set the geometrical and dielectric parameters within the splice. From there, the value of the characteristic impedance is set in the splice.

The splicing device according to the invention preferably also presents the following advantageous arrangements:

insulating means for electrically insulating the electrical continuity means of the cladding;

means for rigidifying the splice;

means ensuring tightness of the splice.

Thanks to the various elements constituting the splice, an operational temperature is obtained which covers the range of from −65° C. to +150° C. and the resistance to fluids and dust is high: for example, the splice presents an excellent resistance to salt spray fog.

BRIEF DESCRIPTION OF THE DRAWINGS

The invention will be more readily understood on reading the following description with reference to the accompanying drawings, in which.

DESCRIPTION OF PREFERRED EMBODIMENT

Figure 1:
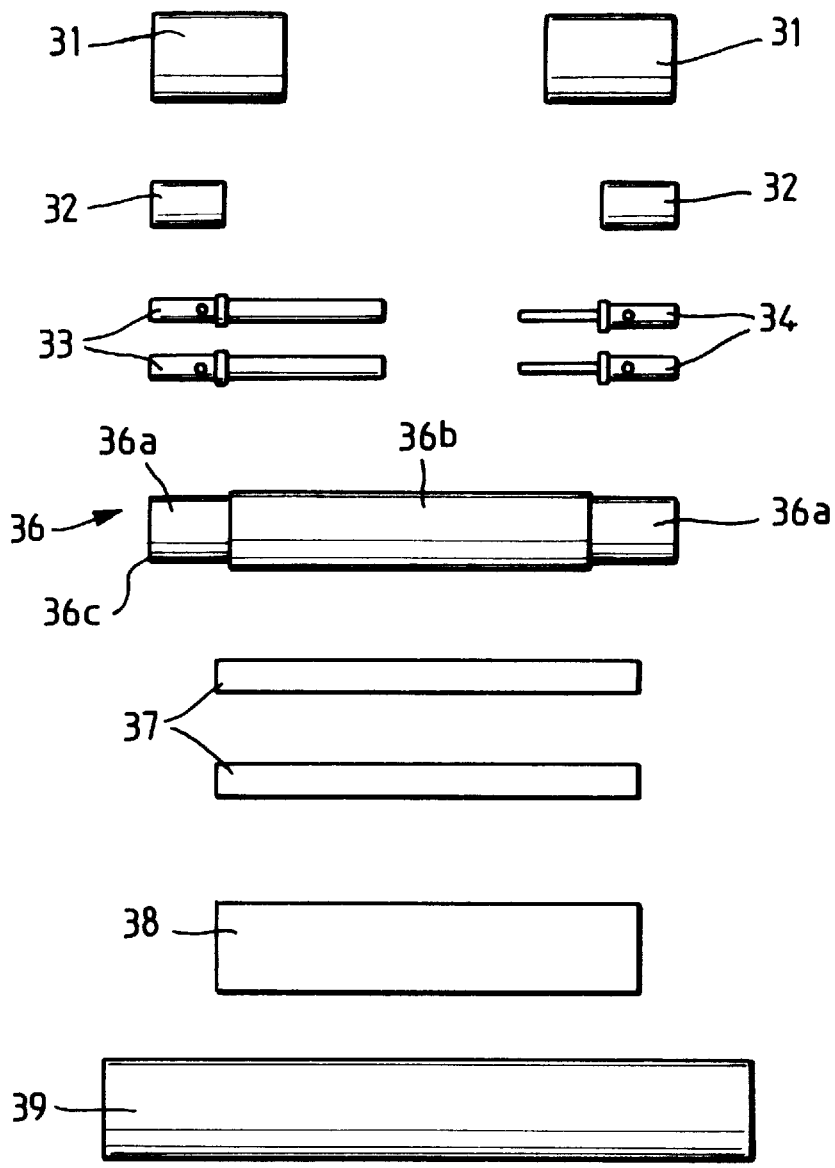
FIG. 1 is an exploded view showing the different parts constituting the splicing device according to the invention.
Figure 2:
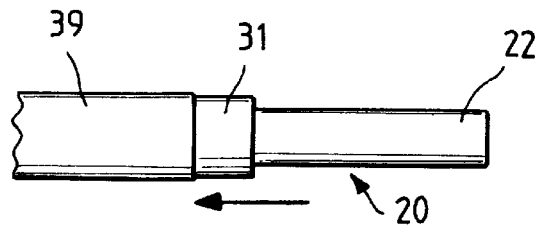
FIGS. 2 to 6 and FIGS. 8 to 16 show the successive steps of assembly of the different parts of FIG. 1 in order to make a splice according to the invention.

Referring now to the drawings, and firstly to FIG. 1, the splicing device comprises:

two sealing sleeves 31 intended to ensure tightness of the splice, two ferrules or conducting rings 32, each being intended to ensure a circumLerential electrical contact with the electrical cladding of one of the electric cables, a first electrical contact couple and a second electrical contact couple, each of these first and second electrical contact couples being intended to connect the primary wires of the electric cables; each of said first and second electrical contact couples being composed of a first element of the contact couple or female contact 33 and of a second element of the contact couple or male contact 34 which is complementary of the female contact 33, a cylindrical cladding box 36 comprising two end parts 36a which may cover and completely surround a ferrule 32 and a central part 36b whose length is at least equal to the length of the first and second contact couples, the outer contour of the cladding box 36 forming an annular shoulder 36c between the end part 36a and the section of the sheath 22 of the cable 20, a first heat-retractable sheath 37 intended to cover the first contact couple, a second heat-retractable sheath 37 intended to cover the second contact couple and a wide heat-retractable sheath 38 intended to maintain a constant distance between the first and second contact couples, and an insulating heat-retractable sleeve 39 intended to cover the splice and the section of cables adjacent the splice, entirely.

In the example shown, the electric cables 20 which are to be connected are identical and comprise (FIG. 4) an outer insulating sheath 22 surrounding an electric cladding 24 in the form of a single or multiple braid, the cladding surrounding two primary wires 26 composed of a first primary wire 26 and a second primary wire 26. Each of the first and second primary wires 26 is itself constituted by an outer insulating sheath surrounding a conducting element.

The ferrules 32 and the cladding box 36 constitute electrical continuity means for the cladding 24, the electrical continuity of the cladding 24 being ensured by a crimping between the end parts 36a of the cladding box, the ferrules 32 and the cladding 24.

The three heat-retractable sheaths 37 and 38 are electrically insulating and constitute insulating holding means which maintain the first and the second contact couples in a constant relative position. The thickness and the material constituting the three heat-retractable sheaths 37 and 38 are chosen so that the characteristic impedance of the splice is equal to that of each of the electric cables 20.

The insulating sleeve 39 constitutes the electrical insulating means of the electrical continuity means of the cladding (32, 36) and also constitutes means intended to rigidify the splice.

In order to ensure tightness of the splice, the two sealing sleeves 31 are shaped so as to be able to cover with contact a section of the sheath 22 of the cables 20.

The method of making the splice according to the invention will now be described with reference to FIGS. 2 to 16.

The first step of producing the splice (FIG. 2) consists in passing the first sealing sleeve 31 around the first electric cable 20, the second end sleeve 31 around the second electric cable 20 and the heat-retractable sleeve 39 around one of the first and second electric cables 20. The sleeves are slid over the electric cables so as to release an end part of each cable 20 to which access is free. It should be noted that the inner diameter of the sleeve 39 is greater than the outer diameter of the sleeves 31, this allowing the sleeve 39 to slide freely over the sleeves 31.

Figure 3:
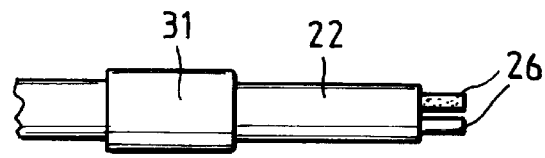
Figure 4:
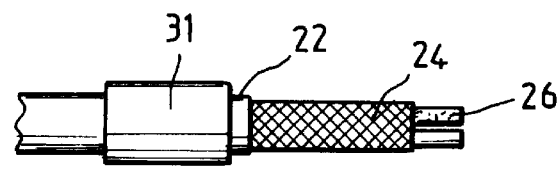

According to FIGS. 3 and 4, the sheath 22 and the cladding 24 are removed from the end part of the first and second cables 20 so that the length of the stripped cladding is substantially equal to twice the length of the ferrules 32. In practice, the sheath 22 and the cladding 24 will preferably be removed from each cable 20 over about 5 mm by a first stripping operation, then the sheath 22 will be removed over about 17 mm by a second stripping operation.

Figure 5:
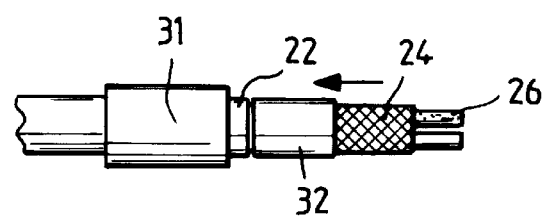
Figure 6:
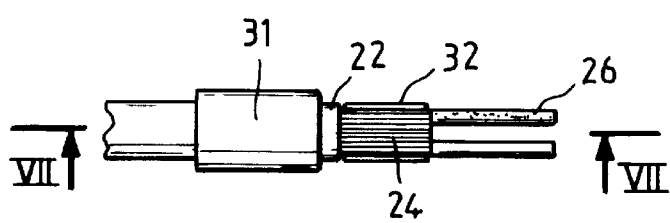

As is shown in FIG. 5, each ferrule 32 is passed around a stripped cladding, positioning it in abutment against the free end of the sheath 22 of the cable 20, then the free end part of the stripped cladding is pushed on the ferrule 32. The cladding braid or braids constituting the cladding 24 are then combed so that the stripped cladding is entirely in contact with the ferrule 32, as may be seen in greater detail in FIGS. 6 and 7.

Figure 7:
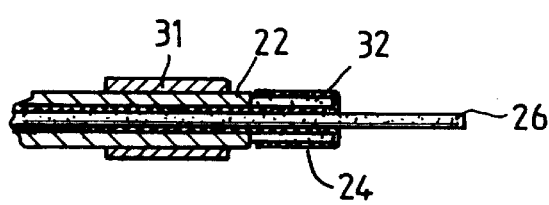
FIG. 7 is a detailed section showing the step of assembly of FIG. 6 in direction VII—VII.
Figure 8:
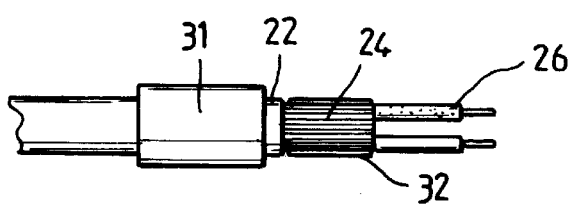

As may be seen in FIG. 7, the inner wall of the ferrule 32 is in contact against the section of the stripped cladding adjacent the free end of the sheath 22 and the outer wall of the ferrule 32 is in contact against the section of the stripped cladding constituting its end part and which has been combed.

Figure 9:
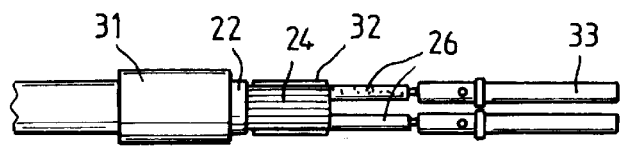
Figure 10:
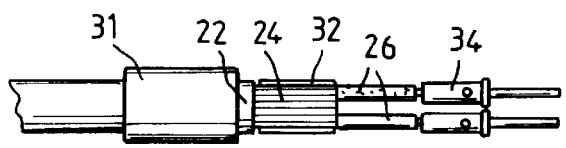

The following step consists in stripping the end of the first and second primary wires 26 of the first and second electric cables 20 (FIG. 8), then in fixing the female contacts 33 of the first and second contact couples to the first and second primary wires 26 of the first electric cable 20 (FIG. 9). In the same way (FIG. 10, the male contacts 34 of the first and second contact couples are fixed to the first and second primary wires 26 of the second electric cable 20 (FIG. 10). Fixation of the male and female contacts may consist in multiple modes of fixation such as, for example, fixation by crimping which crimps the contact on the conducting element of each primary wire, thus allowing a good electrical contact between the contact and the conducting element of the primary wire.

Figure 11:
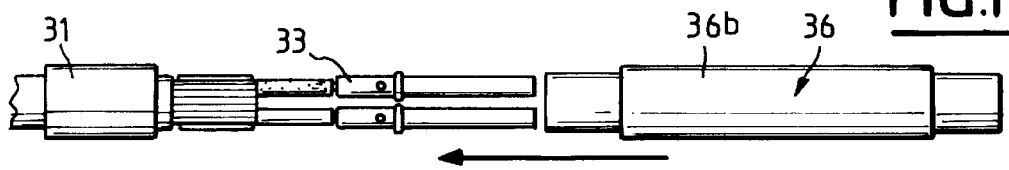

As shown in FIG. 11, the cladding box 36 is passed around one of the electric cables 20 and it is slid until access to the contacts of said electric cable 20 is had.

Figure 12:
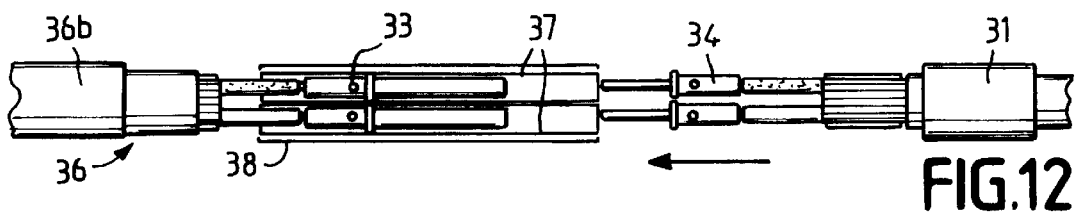

Reference will now be made to FIG. 12. The following step consists in passing the first heat-retractable sheath 37 around the first contact of one of the electric cables 20, in passing the second heat-retractable sheath 37 around the second contact of the same electric cable 20 and in passing the wide heat-retractable sheath 38 around the first and second heat-retractable sheaths 37.

It should be noted that the length of each of the sheaths 37, 38 is at least equal to the length of the first and second contact couples when the male and female contacts are coupled.

Figure 13:
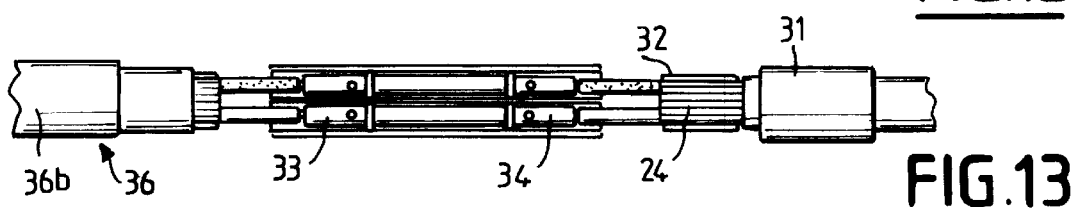

According to FIG. 13, the female contacts 33 and the male contacts 34 are coupled so as to produce the electrical connection between the first primary wires on the one hand and the second primary wires on the other hand. At this stage of production, the three heat-retractable sheaths 37, 38 are centred with respect to the first and second contact couples and the three heat-retractable sheaths are heated to shrink them. The heating temperature is preferably 175° C. minimum and 300° C. maximum. The thickness and material constituting these sheaths have been chosen so that, when they are shrunk, the sheaths hold the first and second contact couples in constant relative position so that the dielectric constant of the splice is equal to that of the cables 20.

Figure 14:
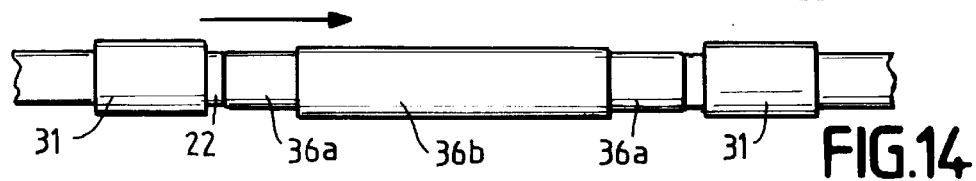

As indicated in FIG. 14, the cladding box 36 is then slid over the sheaths 37 and 38, so that each of its end parts 36a covers a ferrule 32 and each of the end parts 36a of the cladding box 36 is crimped with the corresponding ferrule 32 on the one hand, and the stripped cladding on the other hand. During this step, the electrical continuity of the cladding 24 of each electric cable 20 is ensured thanks to the ferrules 32 and to the cladding box 36. Moreover, thanks to the insulating sheaths 37 and 38, the contact couples 33 and 34 are insulated with respect to each other on the one hand and the contacts 33 and 34 are insulated from the cladding box 36 on the other hand.

Figure 15:
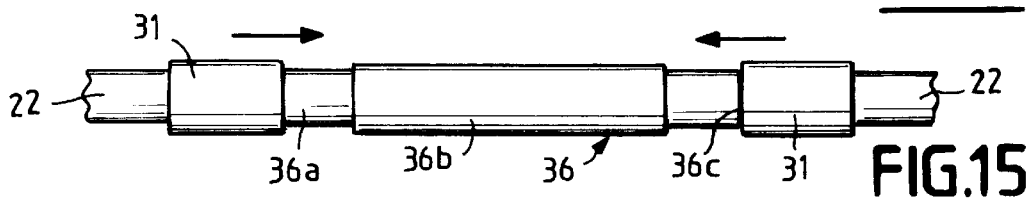
Figure 16:
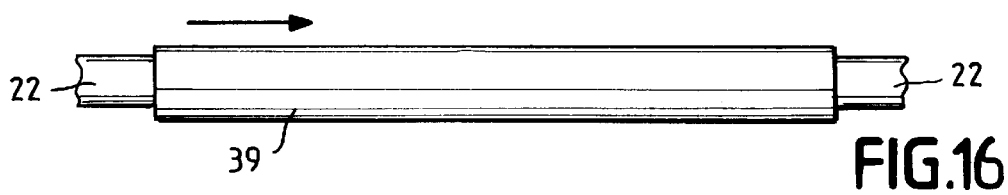

In accordance with FIG. 15, the sealing sleeves 31 must then be positioned by sliding around the sections of the sheath 22 of the cables 20, so that the sealing sleeves 31 are in abutment against the annular shoulder 36c, i.e. with respect to the end parts 36a. Tightness is ensured by the fact that each end sleeve 31 is in contact with one of the sections of the sheath 22 of the cables 20 which are adjacent said end part 36a, on the one hand, and the interior of the insulating heat-retractable sleeve 39 on the other hand.

The last step (FIG. 16) consists in centering by sliding the heat-retractable sleeve 39 around the cladding box 36 and the sealing sleeves 31, then in heating the sleeve 39 with the aid of a hot air generator to shrink this sleeve 39. The minimum heating temperature is preferably 135° C. and when it is shrunk, the sleeve 39 completely covers with contact the splice that has just been produced.

From the description of the method for producing a splice according to the invention which has just been given, it will be understood that it is the choice of the material and thickness of the first and second heat-retractable sheaths 37 and of the wide heat-retractable sheath 38 which enables the splice to present the same characteristic impedance between its two connectors as the first and second cables 20 between their primary wires. In fact, these heat-retractable sheaths 37 and 38 maintain a constant distance between the first and second contact couples. Moreover, the sleeve 39 makes it possible to rigidify and electrically insulate the splice, hence a constant, well-determined, relative position between the first and second contact couples which are maintained parallel to each other, so that the splice may be manipulated without risk of modifying its electrical characteristics.

What is claimed is:

1. A splicing device for connecting two electrical cables by forming a splice, each of said electrical cables including a sheath, a cladding and at least a first primary wire and a second primary wire, said cladding being surrounded by said sheath and surrounding said primary wires, each of said electrical cables having the same characteristic impedance between its first and second primary wires, said splicing device comprising:

first electrical connection means for connecting together said first primary wires of said two electric cables;

second electrical connection means for connecting together said second primary wires of said two electric cables;

a first insulating sheath for covering said first electrical connection means of the first primary wires, said first insulating sheath being comprised of a first material and having a first thickness;

a second insulating sheath separated from said first insulating sheath for covering said second electrical connection means of said second primary wires, said second insulating sheath being comprised of said first material and having a second thickness;

holding means for maintaining said first and second insulating sheaths in a constant relative position, said holding means being comprised of a second material and having a third thickness, said first and second materials and said thicknesses of said first and second sheaths and of said holding means being chosen so that the characteristic impedance between said first and second electrical connection means of the splice is substantially equal to the characteristic impedance of each electrical cable; and continuity means for maintaining electrical continuity of the cladding.

2. The splicing device of claim 1, wherein said splicing device further comprises electrical insulating means for insulating said continuity means of the cladding.

3. The splicing device of claim 1, wherein said splicing device further comprises means for rigidifying the splice.

4. The splicing device of claim 1, wherein said splicing device further comprises means for ensuring tightness of the splice.

5. The splicing device of claim 1, wherein said first and second electrical connection means of the primary wires comprise a first contact couple for connecting said first primary wires and a second contact couple for connecting said second primary wires, said first and second contact couples including a female contact and a complementary male contact crimped on said primary wires.

6. The splicing device of claim 1, wherein said continuity means of the cladding comprises two ferrules, each of said ferrules being intended to ensure a circumferential electrical contact with the cladding of one of the electric cables and a cylindrical conducting cladding box, said cladding box having two end parts, each of the end parts may completely cover a respective one of said ferrules, the electrical continuity of the cladding being ensured by crimping between the end parts of the cladding box, the ferrule and the cladding.

7. The splicing device of claim 1, wherein said first and second insulating sheaths are heat-retractable sheaths and wherein said holding means further comprises a wide heat-retractable sheath for surrounding said first and second insulating sheaths.

8. The splicing device of claim 2, wherein said electrical insulating means further comprises a heat-retractable insulating sleeve adapted for covering said continuity means entirely.

9. The splicing device of claim 3, wherein said means for rigidifying the splice further comprises a heat-retractable sleeve adapted for covering the splice and a section of the sheath of the cables adjacent the splice.

10. The splicing device of claim 4, wherein said means for ensuring tightness of the splice further comprises two sealing sleeves, each of said sleeve as being adapted for covering a section of the sheaths of the cables adjacent an end part of the continuity means.

\* \* \* \* \*